US007008341B2

(12) United States Patent
Wilson et al.

(10) Patent No.: US 7,008,341 B2
(45) Date of Patent: Mar. 7, 2006

(54) REDUCED NOISE MULTI-RIBBED POWER TRANSMISSION BELT

(75) Inventors: James John Wilson, Flesherton (CA); Frank Joseph Feuerborn, Lincoln, NE (US); Brian Dean Wegele, Lincoln, NE (US); Tao Song, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 618 days.

(21) Appl. No.: 09/893,156

(22) Filed: Jun. 27, 2001

(65) Prior Publication Data

US 2003/0017901 A1 Jan. 23, 2003

(51) Int. Cl.
 *F16G 1/28* (2006.01)
 *F16G 5/20* (2006.01)

(52) U.S. Cl. ...................... 474/250; 474/205
(58) Field of Classification Search ............... 474/263, 474/237, 260, 250, 254, 261, 202, 204, 205; 156/137–138, 139–142; 264/219, 238, 326
 See application file for complete search history.

(56) References Cited

U.S. PATENT DOCUMENTS

| | | | | |
|---|---|---|---|---|
| 2,941,413 A | * | 6/1960 | Huber et al. ................ | 428/167 |
| 4,002,082 A | | 1/1977 | Waugh ......................... | 74/231 |
| 4,011,766 A | * | 3/1977 | Waugh ......................... | 474/205 |
| 4,034,615 A | | 7/1977 | Brooks ......................... | 74/229 |
| 4,264,314 A | | 4/1981 | Imamura ..................... | 474/205 |
| 4,449,959 A | | 5/1984 | Matsumura .................. | 474/265 |
| 4,832,670 A | | 5/1989 | Miranti, Jr. ................. | 474/205 |
| 4,898,567 A | | 2/1990 | Tatara et al. ................ | 474/174 |
| 5,055,090 A | | 10/1991 | Miranti, Jr. ................. | 474/249 |
| 5,215,504 A | | 6/1993 | Wong et al. ................. | 474/237 |
| 5,308,291 A | | 5/1994 | Robertson et al. .......... | 474/205 |
| 5,358,453 A | | 10/1994 | Kimura et al. .............. | 474/238 |
| 5,382,198 A | | 1/1995 | Janne ........................ | 474/205 |
| 5,704,862 A | * | 1/1998 | Janne et al. ................. | 474/168 |
| 5,749,800 A | | 5/1998 | Nagel et al. ................. | 474/84 |
| 5,979,639 A | | 11/1999 | Sytema ....................... | 198/731 |
| 5,984,816 A | | 11/1999 | Nishio et al. ................ | 474/87 |
| 6,045,735 A | | 4/2000 | Berthelier ................... | 264/139 |
| 6,402,268 B1 | * | 6/2002 | Lussier ....................... | 305/160 |

FOREIGN PATENT DOCUMENTS

| | | |
|---|---|---|
| DE | 2906619 | 7/1980 |
| DE | 4016469 | 11/1991 |
| DE | 4331482 | 3/1994 |
| GB | 2094439 | 3/1982 |
| JP | 20002302 | 1/2000 |

\* cited by examiner

*Primary Examiner*—Marcus Charles
(74) *Attorney, Agent, or Firm*—Nancy T. Krawczyk

(57) ABSTRACT

A multi-ribbed power transmission belt has transverse grooves in the compression section which are oriented at angles other than perpendicular. The combination of longitudinal grooves and transverse grooves form a plurality of cogs on the belt surface, with a row of cogs being defined between adjacent transverse grooves. Each cog has a pitch length P extending from a location on the cog to the identical location on the longitudinally adjacent cog. The pitch lengths of the rows of cogs are randomized over the entire length of the belt to reduce the noise of the belt as it travels about its associated pulleys.

5 Claims, 1 Drawing Sheet

REDUCED NOISE MULTI-RIBBED POWER TRANSMISSION BELT

FIELD OF THE INVENTION

The invention relates to multi-ribbed power transmission belts designed to minimize noise while in operation.

BACKGROUND OF THE INVENTION

Power transmission belts having a variety of groove and rib configurations are known. One such belt is a multi-ribbed belt. The multi-ribbed belts have a tension section, a load carrying section, and a compression section. Multi-ribbed belts may also be provided with transverse grooves; such transverse grooves extending either traverse to the belt or at an angle relative to the traverse direction of the belt. The longitudinal and transverse grooves are located in the compression section. Such belts are known as cogged multi-ribbed belts, examples of which are disclosed in U.S. Pat. Nos. 4,002,082 and 5,382,198. Cogged multi-ribbed belts exhibit improved flexibility and longer life.

However, cogged multi-ribbed belts create more noise due to a non-continuous rib entering and exiting the grooved pulley. Noise is generated when the tooth travels and presses into the pulley groove, compressing and displacing the air in the groove and noise is generated when the tooth exits the pulley groove as air rushes to fill the now empty pulley groove. Furthermore, there are harmonic noise spikes generated by the cogs at the cog engagement frequency.

Two methods are known to reduce the noise of a cogged multi-ribbed belt. The first is to incline the transverse grooves at an angle relative to the transverse direction. This reduces the overall noise level but the harmonic noise spikes are often still objectionable.

The second is to vary the pitch of the cogs with a repeating pitch pattern, as disclosed by U.S. Pat. Nos. 4,264,314 and 4,832,670. U.S. Pat. No. 4,264,314 discloses a cog belt with reduced noise. The transverse groove depths, the groove angles, and the distance between the grooves are varied. Similar to U.S. Pat. No. 4,264,314, U.S. Pat. No. 4,832,670 also discloses multiple elements of the belt construction are varied simultaneously to produce a reduced noise belt. The belt is defined by a repeating sequence pattern along the length of the belt. For both belts, because of the number of variables that must be altered, construction of the belt may be more complex and costly. Also, the disclosed methods are less effective in reducing overall noise levels than inclining the transverse grooves and do not always eliminate the harmonic noise spikes.

SUMMARY OF THE INVENTION

The present invention is directed to a power transmission belt having an inner surface comprising longitudinally extending grooves and transverse grooves. The transverse grooves are inclined at an angle less than 90° relative to the longitudinal direction of the belt and all the transverse grooves have the same groove depth. The transverse and longitudinal grooves form transverse rows of cogs on the belt inner surface. The rows of cogs have at least three different longitudinal lengths, and the rows of differing lengths are randomly arranged along the entire length of the belt.

In one aspect of the invention, the belt has rows of cogs having three to six different longitudinal lengths.

In another aspect of the invention, on the inner surface of the belt, no more than four longitudinally adjacent rows of cogs have the same longitudinal length.

BRIEF DESCRIPTION OF THE DRAWINGS

The invention will be described by way of example and with reference to the accompanying drawings in which.

DETAILED DESCRIPTION OF THE INVENTION

Figure 1:
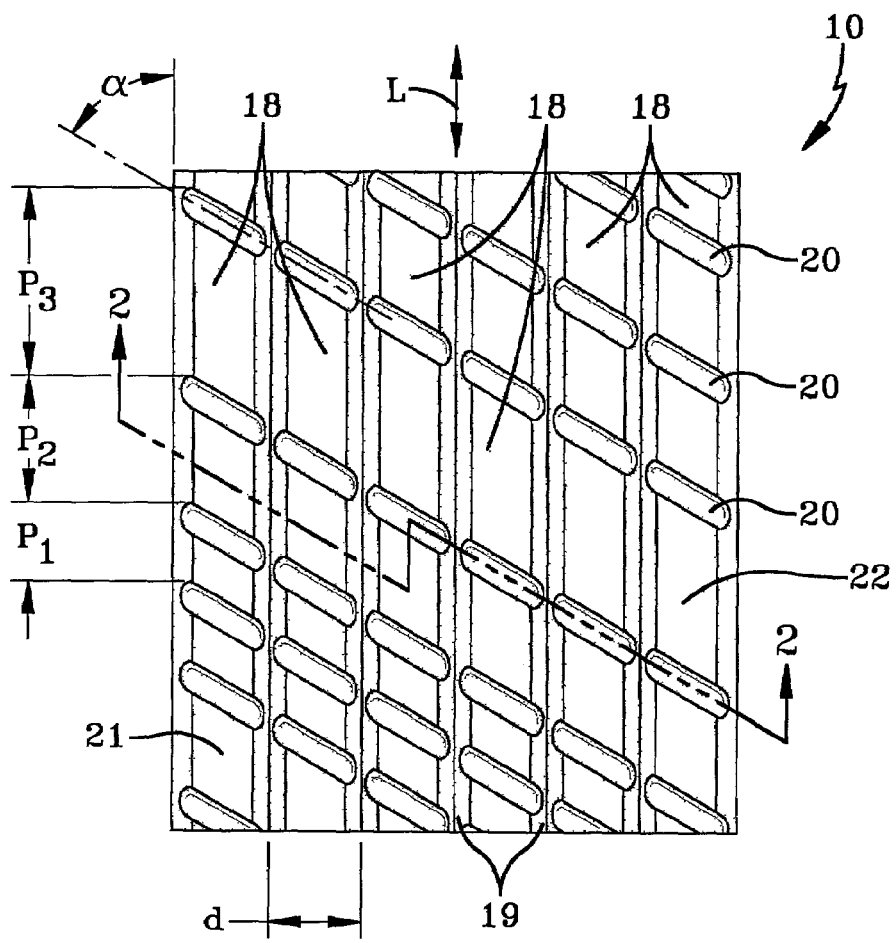
FIG. 1 is a bottom plan view of a section of the belt of this invention.
Figure 2:
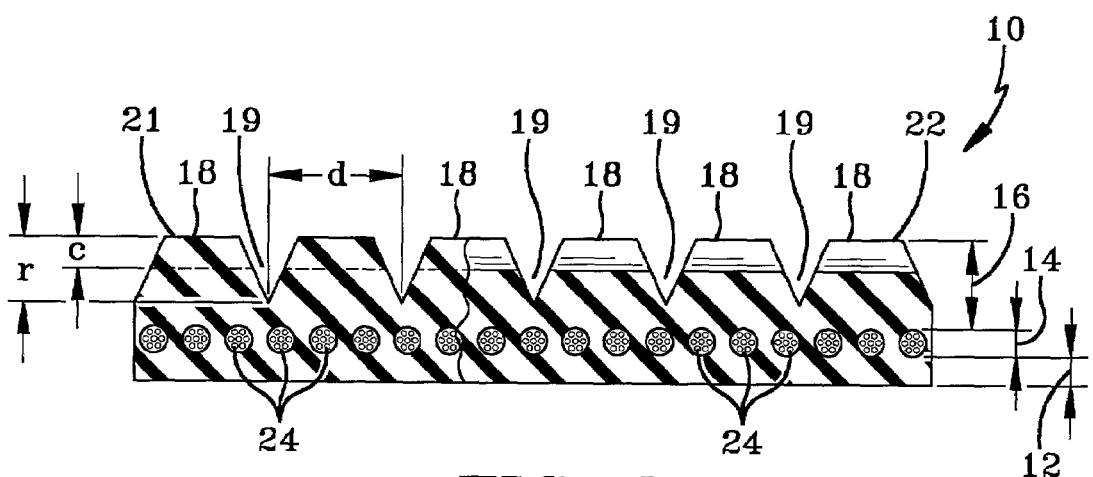
FIG. 2 is an enlarged view of the belt taken along the line 2—2 in FIG. 1.

The multi-ribbed power transmission belt 10 has a tension section 12, a load carrying section 14, and a compression section 16. The compression section has a plurality of longitudinal ribs 18 formed by parallel longitudinal grooves 19 and a plurality of parallel transverse grooves 20. The transverse grooves 20 are oriented at an angle a other than perpendicular to the longitudinal direction L. The combination of longitudinal grooves 19 and transverse grooves 20 form a plurality of cogs 21 on the belt surface, with a transverse cog row 22 being defined between adjacent transverse grooves 20.

The angle $\alpha$ of the transverse grooves 20 is from 20° to 85°. While the number of ribs shown in the drawings is six, it should be appreciated that a multi-ribbed transmission belt may contain anywhere from three upwards to thirty or more. The grooves 20 may be U shaped, V shaped, or V shaped with a rounded bottom or any other convenient shape. The depth c of all the transverse grooves 20 are the same and the depth r of all the longitudinal grooves 19; however, the depth c of the transverse grooves 20 can be the same or different from the depth r of the longitudinal grooves 19. The depth r of the longitudinal grooves 19 is generally greater than the depth c of the transverse grooves 20 but not so deep as to cut into the longitudinal reinforcing cords 24.

Each transverse cog row 22 has a longitudinal length P extending from a location on the cog 21 to the identical location on the longitudinally adjacent cog 21; the determining location, as seen in FIG. 1, is best selected to be a corner edge adjacent to the transverse groove 20. In accordance with the invention, the longitudinal length P of adjacent cog rows 22 may not have the same length P. In the illustrated belt, the belt has three discrete different longitudinal lengths, $P_1$, $P_2$, and $P_3$.

Typical normalized length ratios of lengths of the small, medium and large lengths useful in the belt 10 include 9-10-11, 11-13-15, 5-6-7, 9-11-13, 7-9-11, 9-10-12, 6-7-9, and 4-7-10. While these ratios are only for three differing normalized longitudinal lengths, it is within the scope of the present invention to utilize three to six different longitudinal lengths. The total number of longitudinal lengths, $P_n$, for a particular belt would be limited by the belt size and the complexity of the mold required to form the belt.

Because the multi-ribbed belt 10 is driven about its associated grooved pulleys due to the friction interaction between the pulley grooves and the sides of the longitudinal ribs 18, the sequencing of the different longitudinal lengths $P_1$, $P_2$, $P_3$ need not be limited to a repeating defined period. The longitudinal lengths along the entire length of the belt may be randomized.

One exemplary sequencing pattern for a belt, using three discrete pitch lengths is:

```
3 3 3 2 1 2 3 2 3 2 1 1 2 1 1 2 1 2 3 1 3 3 1 2 2 2 1 3 1 2 1 3 1 1 1 2 3 3 2 2 2 3 2 1 1
3 3 3 2 1 2 3 2 3 3 2 1 2 2 1 1 3 2 1 2 3 1 1 3 1 2 3 2 1 1 3 1 2 2 3 3 3 1 1 3 3 2 3 1 1
1 2 2 3 2 1 1 2 1 3 3 2 3 3 3 2 2 3 3 1 1 3 2 1 2 2 1 1 3 2 2 3 3 3 1 2 2 1 1 1 2 3 2 3 1
1 1 2 1 2 2 3 3 1 1 3 2 1 3 3 2 3 1 3 3 2 3 2 1 2 3 1 3 1 1 2 1 2 1 2 3 3 2 3 3 3 1 1 2 1
2 3 2 2 2 2 3 3 2 1 1 3 2 3 2 3 1 2 2 1 2 1 3 1 1 1 1 3 2 1 2 1 3 3 2 3 2 1 2 1 2 3 2 1 2
2 3 1 1 1 3 1 3 1 3 2 3 3 2 1 1 2 3 1 2 2 3 2 3 3 3.
```

The only limitation in sequencing of the pitch lengths is a limitation on the number of adjacent similar pitch lengths. If too many cogs rows 22 having an identical pitch length are adjacent, then the desired reduction in noise may not be achieved. Additionally, if too many cog rows 22 having a small pitch length are adjacent, durability issues may arise. No more than six, preferably four, identical longitudinal length cog rows 22 should be adjacent to one another.

To determine the actual longitudinal length of the cog rows 22, the following equation is used:

((length ratio number)*(belt length))/(total normalized length for sequence).

For example, using the sequence listed above and the ratio combination of 4-7-10, the total normalized length for the sequence is 1760. The total normalized length is achieved by substituting the ratio length number (i.e., 4, 7, or 10) for the sequence length (i.e. 1, 2, or 3) and than adding up the length numbers for the entire sequence. For a belt length of 222.60 cm (87.6 inches), and using the sequence above, the longitudinal lengths are:

small length $P_1$: (4*222.6)/1760=0.506 cm medium length $P_2$: (7*222.6)/1760=0.885 cm large length $P_3$: (10*222.6)/1760=1.265 cm.

A second pitch sequence using three pitch lengths is:

individual turns thereof arranged in substantially equally spaced relation across the belt body. These cords may be made from glass fibers, aramid fibers, carbon fibers, steel, polyester, high tenacity rayon, or polyaramide.

The preferred method of manufacturing the belt of this invention is to build the belt inverted on a rigid mandrel of the proper diameter. A layer of tension stock is first applied to the mandrel followed by the helical windings of the reinforcing cord 24. Then a layer of cushion stock is applied over the reinforcing cord 24. The angular grooves 20 are molded into the product at the time of cure by means of a flexible diaphragm having the helical pattern opposite that of the grooves placed around the cushion stock and compressed against the product by steam pressure, air pressure, or other means. Following the curing process, the longitudinal grooves are then formed in the conventional manner by machining, grinding, etc.

By pitching the cogged belt 10 in the manner disclosed in the present invention, the noise spikes at the harmonic frequency are reduced as well as the overall noise of the belt 10.

What is claimed is:

1. A power transmission belt having an inner surface comprising longitudinally extending grooves and transverse grooves, the transverse grooves are inclined at an angle less than 90° relative to the longitudinal direction of the belt and all the transverse grooves have the same groove depth, the

```
2 1 1 1 1 3 2 1 2 3 1 2 2 1 1 3 2 3 2 1 2 1 3 2 3 2 3 3 1 3 3 2 2 2 1 1 2 1 2 2 3 1 3 3 2 1 3 1
2 1 1 3 1 1 3 2 1 1 1 3 1 2 3 3 3 1 3 2 1 3 3 3 2 3 3 1 2 2 3 3 3 1 2 2 1 2 1 2 1 2 2 2 1 3 3 2
3 1 1 3 3 1 2 2 1 1 3 2 2 2 1 2 2 1 3 1 3 3 1 1 3 3 1 2 2 3 1 3 1 1 1 3 3 1 2 1 2 1 1 2 3 2 3 3
2 2 3 2 1 2 3 2 1 1 1 3 3 2 2 3 2 1 1 2 1 3 2 2 3 3 3 3 2 1 1 3 1 1 2 3 2 2 3 3 3 2 1 2 1 2 2 1
3 2 1 1 1 2 1 3 3 1 2 2 3 1 2 3 3 2 2 1 1 2 3 3 2 1 1 2 3 3 3 2 3 3 3 2 1 3 1 2 1 3 3 2 3 1 1 2
1 1 2 2 2 3 3 1 2 2 1 1 2 3 1 3 3 3 2 3 3 1 2 1 1 1 3 2 2 2 1 1 2 3 1 3 3 2 1 3 3 2 1 2 3 3 2
```

For this second pitch sequence, using a ratio combination of 4-7-10, the normalized length is 2016. For a belt length of 2560 mm, the longitudinal lengths are:

small length $P_1$: (4*256.0)/2016=0.508 cm medium length $P_2$: (7*256.0)/2016=0.888 cm large length $P_3$: (10*256.0)/2016=1.270 cm The belt of this invention is illustrated in the drawings as being elastomeric. The elastomers may be any one of those known to be suitable for use In such belts, e.g., polychloroprene, polyurethane, NBR, IIR, IR, SBR, CSM, EPDM, other thermosets, thermoplastic elastomers and other polymer alloys.

The load carrying section 14 of this belt can be made of any suitable material and used in any suitable technique known in the art. Preferably, the load carrying section 14 is made of a helically wound load carrying cord 24 having transverse and longitudinal grooves form transverse rows of cogs on the belt inner surface, wherein the rows of cogs have at least three different longitudinal lengths, and the rows of differing lengths are randomly arranged, in a non-sequential manner, along the entire length of the belt.

2. A belt in accordance with claim 1 wherein the belt is characterized by the rows of cogs having three different longitudinal lengths.

3. A belt in accordance with claim 1 wherein the belt is characterized by the rows of cogs having three to six different longitudinal lengths.

4. A belt in accordance with claim 1 wherein no more than four longitudinally adjacent rows of cogs have the same longitudinal length.

5. A belt in accordance with claim 1 wherein the belt has three different longitudinal lengths, the smallest length being designated as 1, the medium length being designated as 2, and the largest length being designated as 3, and the sequence around the entire belt is 3 3 3 2 1 2 3 2 3 2 1 1 2

```
1 1 2 1 2 3 1 3 3 1 2 2 2 1 3 1 2 1 3 1 1 1 2 3 3 2 2 2 3 2
1 1 3 3 3 2 1 2 3 2 3 3 2 1 2 2 1 1 3 2 1 2 3 1 1 3 1 2 3 2
1 1 3 1 2 2 3 3 3 1 1 3 3 2 3 1 1 1 2 2 3 2 1 1 2 1 3 3 2 3
3 3 2 2 3 3 1 1 3 2 1 2 2 1 1 3 2 2 3 3 3 1 2 2 1 1 1 2 3 2
3 1 1 1 2 1 2 2 3 3 1 1 3 2 1 3 3 2 3 1 3 3 2 3 2 1 2 3 1 3
```

```
1 1 2 1 2 1 2 3 2 3 3 3 1 1 2 1 2 3 2 2 2 2 3 3 2 1 1 3 2 3
2 3 1 2 2 1 2 1 3 1 1 1 1 3 2 1 2 1 3 3 2 3 2 1 2 1 2 3 2 1
2 2 3 1 1 1 3 1 3 1 3 2 3 3 2 1 1 2 3 1 2 2 3 2 3 3 3.
```

* * * * *